United States Patent Office 3,514,023
Patented May 26, 1970

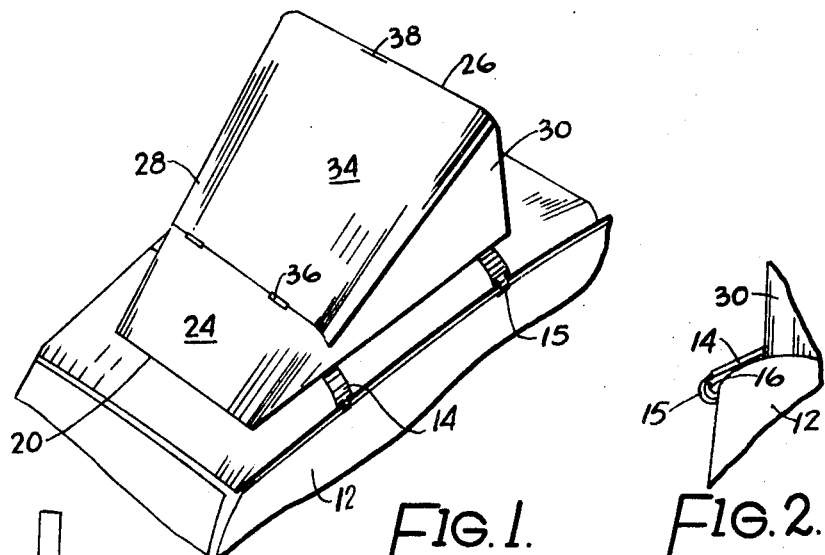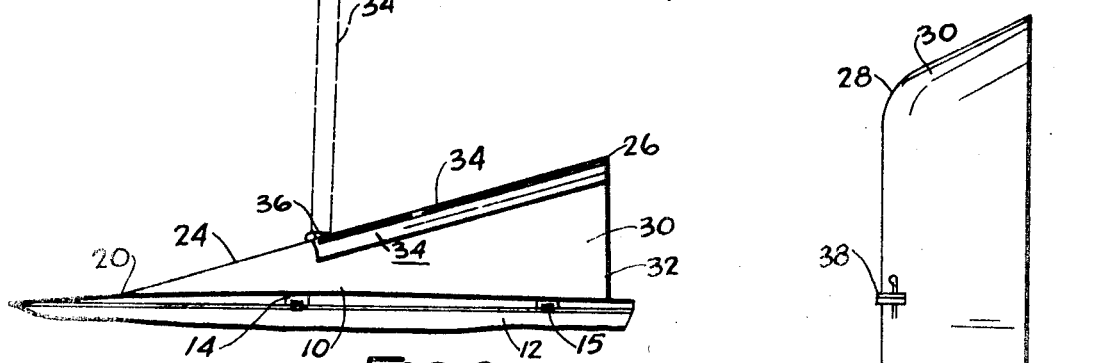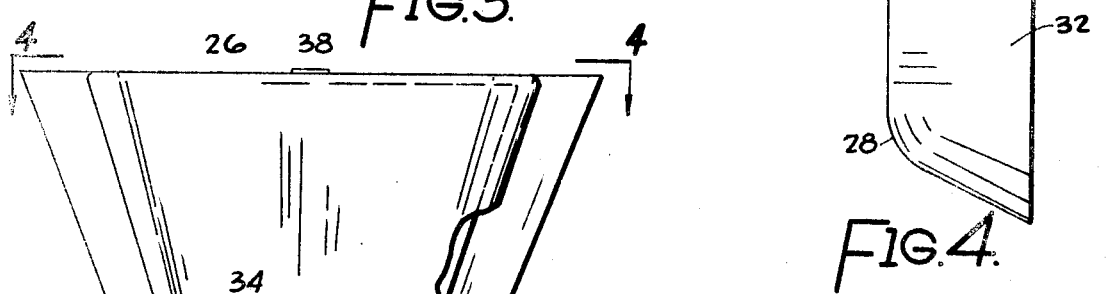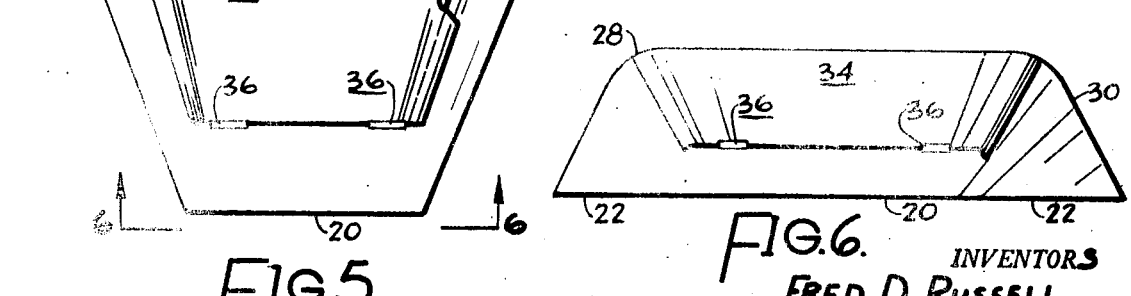

3,514,023
ROOFTOP CARRIER
Fred D. Russell and George Clyde Brooks, both of 8131B White St., Del Rio, Tex. 78840
Filed Feb. 28, 1968, Ser. No. 709,062
Int. Cl. B60r 9/04; B60j 7/20
U.S. Cl. 224—42.1      4 Claims

ABSTRACT OF THE DISCLOSURE

An aerodynamically designed automobile rooftop carrier which not only stores luggage but also reduces the air drag caused by a trailer that exceeds the height and width of the pulling car. This reduction is obtained by diverting the air flow over the trailer and around its sides.

SUMMARY OF THE INVENTION

Our carrier utilizes a bottom plate of trapezoidal shape adapted to rest on the roof of the car and having front and rear parallel edges, the front edge being shorter than the rear edge, and the side edges extending outward and rearward from the front edge.

Our carrier also uses a top plate of like shape which extends upward and rearward, the front edge of the top plate being coincident with the front edge of the bottom plate, the side edges of the top plate overlying the side edges of the bottom plate and being joined thereto by triangularly shaped vertically inclined side walls. The rear edge of the top plate is disposed above the rear edge of the bottom plate and is joined thereto by a vertical rear wall also secured to the side wall.

The resulting wedge shaped hollow structure reduces air drag as indicated, thus decreasing fuel consumption and engine wear as well as reducing overheating of engine coolant and transmission fluid. An access door can be provided to permit use of the interior of the structure for protected storage.

BRIEF DESCRIPTION OF THE DRAWINGS

In the drawings:
FIG. 1 is a perspective view of our carrier in use;
FIG. 2 is a detail view showing how our carrier is secured to a car roof;
FIG. 3 is a side view of our carrier;
FIG. 4 is a view through 4—4 in FIG. 5;
FIG. 5 is a top view of our carrier; and
FIG. 6 is a view through 6—6 in FIG. 5.

DETAILED DESCRIPTION OF PREFERRED EMBODIMENTS

Referring now to FIGS. 1-6, a bottom plate 10 of trapezoidal shape, and slightly curved if desired to conform to a rooftop, rests on top of the roof of an automobile 12. Rubber strips can be secured to the bottom surface of the plate as protection, and nylon straps or belts 14 with end clips 15 can detachably secure the plate to the roof rain gutters 16.

The plate 10 has a relatively short front edge 20 and a relatively long rear parallel edge 22 joined by outwardly and rearwardly extending side edges.

A top like trapezoidally shaped plate 24 extends inclinedly upwards, with its front edge coincident with the front edge of plate 10, its rear edge 26 being parallel to but above edge 22 and its side edges 28 (which are slightly curved as is edge 26) overlying the side edges of the bottom plate. Vertically inclined side walls 30 in the form of right triangles extend between the front and rear edges as well as the side edges of both plates. A vertical rear wall 32 interconnects the rear edges of both plates to the side walls.

Portions of the side walls as well as the top plate can be formed into an integral access door 34 hinged at 36 with a latch 38 whereby access for storage is obtained.

Having thus described our invention, we claim as new and desire to secured by Letters Patent:

1. A cartop luggage carrier adapted to be detachably secured to the car roof which also functions to reduce air drag, said carrier comprising
   a bottom plate adapted to rest on the roof, said plate having parallel rear and front edges, the front edge being shorter than the rear edge, and side edges connecting corresponding ends of the front edges to the corresponding ends of the rear edges whereby the bottom plate has the shape of a trapezoid;
   first and second oppositely disposed vertically inclined side walls, each side wall extending vertically inclinedly upward from a corresponding side edge of the bottom plate, each side wall having the general shape of a right triangle with one vertex coincident with the front edge, one leg coincident with the rear edge, the other leg being coincident with the corresponding side edge;
   a top trapezoidally shaped upwardly inclined plate having a front edge coincident with the front edge of the bottom plate, opposite side edges each coincident with the hypotenuse of the corresponding side wall, and a rear edge parallel to but disposed above the rear edge of the bottom plate; and
   a rear vertical wall connecting said one legs of both side walls and the rear edges of both plates.

2. A carrier as set forth in claim 1 further including an access door.

3. A carrier as set forth in claim 2 wherein said door includes portions of the top plane and side walls.

4. A carrier as set forth in claim 3 further including means secured to the bottom plate to detachably secure same to said roof.

References Cited

UNITED STATES PATENTS

| 2,597,656 | 5/1952 | Martin | 224—42.1 |
| 2,914,231 | 11/1959 | Hornke | 224—42.1 |
| 3,185,518 | 5/1965 | Zentner | 296—23 |
| 3,415,566 | 12/1968 | Kerrigan | 296—1 |

GERALD M. FORLENZA, Primary Examiner

U.S. Cl. X.R.

296—1